May 1, 1945.　　L. MUSANTE　　2,374,769
HEAD TURNING MACHINE
Filed Feb. 13, 1943
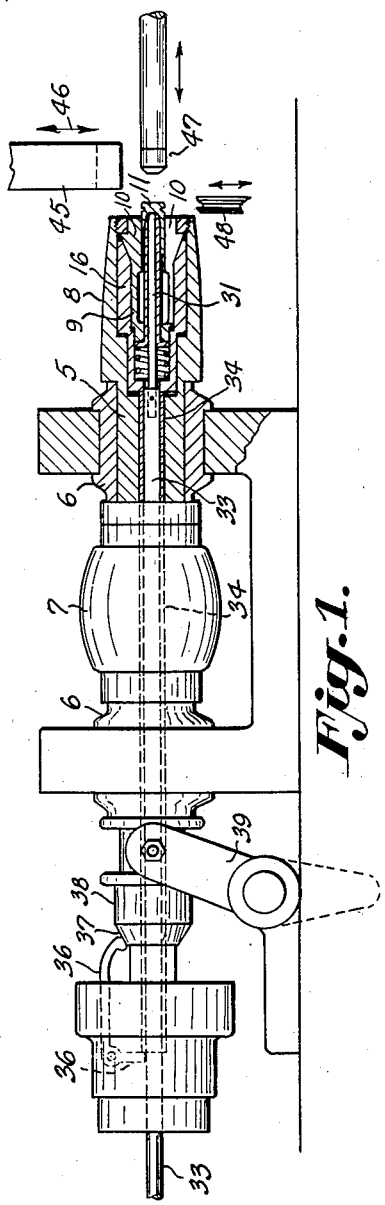

Patented May 1, 1945

2,374,769

UNITED STATES PATENT OFFICE 2,374,769

HEAD TURNING MACHINE

Louis Musante, Ansonia, Conn.

Application February 13, 1943, Serial No. 475,748

8 Claims. (Cl. 279—46)

This invention relates to head turning machines, and more particularly to a machine of this type for operating on tubular work pieces, and especially to the means for holding the tubular work piece during operations on the piece.

In machines of this type the work piece is usually gripped from the outside with the jaws of a collet or similar clutch, and if the walls of the tubular work piece are relatively thin there is danger that the pressure of the jaws will compress or crimp the walls of the tube causing it to slip or become loosened during the working operations on the piece or causing it later to crack or fail. This difficulty has been especially troublesome in turning cartridge shells, as the wall of the shell would be crimped slightly and would later fail from pressure in the loading operation and would have to be discarded.

It is therefore a particular object of this invention to provide means associated with the collet or clutch to support the walls of the tubular work piece from the inside against the pressure of the clutch jaws so that there is no chance for the walls to yield or be crimped by the pressure of these jaws.

It is also an object to provide a device of this character which may be applied to the collet or clutch now generally employed without requiring a reconstruction of the clutch.

Although the device is shown in the drawing and described for performing turning operations on a cartridge shell, it is to be understood it is not limited to such use as it may be employed for holding any tubular work piece open at either one or both ends for various operations, in cutting-off machines, and the like.

With the foregoing and other objects in view I have devised the construction illustrated in the accompanying drawing forming a part of this specification. It is, however, to be understood the invention is not limited to the specific construction and arrangement shown, but may employ various changes and modifications within the scope of the invention.

In this drawing:

Fig. 1 is a partial side elevation and partial section of the spindle assembly of a head turning machine showing my invention applied thereto;

Fig. 2 is a longitudinal section on a larger scale of the head showing the collet or clutch and my invention applied thereto;

Fig. 3 is a detail section showing a slight modification, and

Fig. 4 is a longitudinal section of a portion of the device showing another modification.

The spindle of Fig. 1 is shown somewhat diagrammatically, no attempt being made to show all the details of construction as most of them are old and well known and are shown merely to illustrate the operation of my improvement. The spindle is indicated generally at 5 mounted to rotate in suitable bearings 6 and driven from any suitable source of power by a belt running over a pulley 7. At one end of the shaft is a hollow head 8 within which is mounted the clutch for gripping a work piece. In the embodiment shown, this clutch comprises a split collet 9 having suitable jaws 10, usually three in number, gripping a work piece 11, in the present case shown as a cartridge shell, on which turning operations are to be performed on the exposed closed end, in this case indicated by way of example as turning the shell throw-out groove 12. The collet has an inner tubular end 13 and it is split longitudinally at spaced points about its periphery in the well known manner, as indicated at 14, to form the separate jaws 10 and to connect them to the tubular end 13 by the reduced spring arm 15. Embracing the collet and slidable within the head 8 is a sleeve 16 for controlling the operation of a clutch jaw. On the outer surfaces of the jaws are inclined cam surfaces 17 and similarly tapered walls 18 are formed on the inner side of the sleeve 16. Mounted in the outer end of the head 8 is a washer 19, and the clutch jaws have radial shoulders 20 against the inner wall of this washer. The inner end portion of the sleeve 16 is reduced, as shown at 21, and within this reduced portion is a spring 22 abutting at one end against the shoulder 23 at the inner end of the sleeve and at its other end normally pressing against the collet 9 to thus tend to shift the collet outwardly and the sleeve 16 inwardly or in the opposite direction to thereby tend to shift the cam surfaces 18 backwardly from the similarly inclined surfaces 17 and to permit the jaws to move outwardly under action of the spring portions 15 to release the work. These movements of course are very small in normal operation.

It will be understood that as the walls 24 of the tubular element or shell are quite thin, there is danger the pressure of the jaws 10 might compress these walls or cause them to yield or be crimped. This might cause the work piece to loosen or slip during turning or other operation on the exposed end of the work piece, or the crimping ruptures or weakens the wall so that it will later fail or break during the loading or other operation on the shell. To overcome this difficulty I mount within the collet or chuck 9 a bar 25 which may be a solid or a tubular bar and extends within the jaws 10, this end being a snug fit on the interior of the shell or other tubular work piece 11. In the case of a cartridge shell, the inner wall is cylindrical for a portion of its length, as indicated at 26, and is then tapered for a certain distance 27 toward the closed end of the shell. Therefore to properly fit the interior of the shell the free end portion of the rod 25 is similarly shaped; that is, it is cylindrical or straight as at 28 to fit the straight portion of the shell and is tapered at 29 to fit the tapered portion of the shell. This rod 25, therefore, provides an inner support for the entire tubular portion of the shell or other work piece, and as this end is of the same size and therefore a good fit for the interior of the piece there is no chance for the walls of the work piece to yield inwardly under the pressure of the chuck jaws 10, and therefore the work is always properly gripped and held against slipping during the working operation and there is no danger of the walls being crimped or otherwise injured.

The bar 25 may be conveniently mounted in the inner tubular end portion 13 of the collet and may have a flange 30 on its inner end seating between the spring 22 and the end of the collet. This does not interfere with transfer of pressure from the spring 22 to the collet, but it employs the spring to hold the rod in position and permits the rod to yield slightly should for any reason the work piece or shell 11 be pushed in too far through variations in the shell or too great movement of the feeding mechanism.

However, if desired, the flange 30 may be located at the other end of the spring 22 against the shoulder 23, as shown in Fig. 4. In this case the bar 25 is made somewhat longer. The arrangement of Fig. 2, however, is preferred because it permits slight yielding of the bar 25 under certain conditions as described, while in the arrangement of Fig. 4 the inner end or flange of the bar is against the solid shoulder 23.

Within the hollow bar 25 the knockout pin 31 may be mounted to extend through this bar so that its outer end 32 can engage the inner wall of the closed end of the work piece to eject it from the clutch after the work operations have been performed and the clutch jaws have been released. This pin is shown as connected to the usual knockout rod 33 extending longitudinally through the shaft and operated in proper timed relation with the release of the clutch by suitable cam means (not shown). The sleeve 16 for controlling the collet or clutch jaws is operated by the usual tube 34 mounted in the shaft engaging at one end against the inner end 35 of the sleeve and at its other end operated by suitable fingers 36 through a cam 37 on a collar 38 slidable on the shaft in proper timed relation with the other operations by a lever 39 operating through a suitable cam, also not shown.

The knockout pin 31 may be connected to the knockout rod 33 in various ways, as for example it may seat at its inner end in a socket 40 in the rod and held by a suitable pin 41, or if desired, as shown in Fig. 3, there may be a deeper pocket 42 in the rod and the pin 41 pass through an elongated slot 43 in the pin 31, with a spring 44 at the inner end of this pin. This spring may be used to shift the pin 31 outwardly to eject the work piece from the clutch when the jaws are released. However, as the work might tightly grip the bar 25 it is preferred to have a positive operation of the knockout pin 31.

In Fig. 1, means for feeding the work piece or shell 11 into the collet or clutch is shown diagrammatically. This comprises feed fingers 45 to which the work pieces are fed by any suitable mechanism (not shown) these fingers then being reciprocated as indicated by the arrow 46 to carry the work piece into alignment with the collet or clutch jaws 10. A feed plunger 47 is then reciprocated to force the work piece from the fingers 45 into the clutch jaws and onto the end of the rod 25 to locate it in the proper position therein. These may also be located by the rod 25. Thus the combination gives a more accurate location of the work piece, insuring more accurate operation on the piece and fewer rejections. The jaws 10 are then closed by operation of the sleeve 16 and the plunger 47 remains against the end of the shell during the turning operation. The tool 48 is then advanced to the working position to perform the desired operation on the exposed end of the work piece. After this operation is completed the tool is withdrawn, the clutch jaws released, the plunger 47 withdrawn and the work piece ejected by operation of the pin 31. However, the use of the central bar 25 is not limited to use with the knockout pin 31, as shown, as the bar 25 itself could be operated as the knockout pin to shift the work piece a sufficient distance outwardly after the jaws are released to permit a draw-out mechanism to grip the piece and withdraw it from the clutch and the bar, or the draw-out mechanism may be operated to grip the exposed end of the work piece and withdraw it without any knockout pin within the clutch.

It will be understood from the above that this is a very simple device which effectively supports the thin walls of a tubular work piece, preventing their collapse or injury from the pressure of the collet or clutch jaws, and that it may be applied to a collet or clutch without reconstructing this collet. It will also be seen that this center rod or support may be so shaped as to support the entire tubular wall of the work piece, obviating any chance of any portion of these walls being crushed or injured.

Having thus set forth the nature of my invention, what I claim is:

1. In a device of the character described, a rotatable spindle, a split collet in the spindle having gripping jaws for a thin walled tubular work piece, means for clamping the jaws on the work piece, a central tubular bar shaped to fit the inner diameter of the work piece and located within the jaws of the collet to support the walls of said work piece and prevent their collapse under pressure of the jaws, an ejector means mounted in the bar to engage the work piece to remove it from the jaws and bar, and means for operating the ejector means.

2. In a device of the character described, a rotatable spindle, clutch jaws in the spindle to grip a tubular work piece, means for clamping the jaws on the work piece, a tubular central bar within the jaws shaped to fit the internal diameter of the work piece and support its walls against collapse under pressure of the jaws, a slidable pin in the bar adapted to engage the work piece for removing the work piece from the jaws and the bar, and means for operating said pin.

3. In a device of the character described, a rotary spindle, clutch jaws in the spindle to grip a tubular work piece, means for clamping the jaws on the work piece with an end portion projecting from the jaws, a central tubular bar within the jaws and including a cylindrical portion and a tapered free end portion to fit similarly shaped inner surfaces of a tubular work piece having a closed end and support the walls of the said work piece against collapse under pressure of said jaws, the end of said bar adapted to engage the closed end of the work piece to limit its insertion in the jaws, and a rod slidable in the tubular bar adapted to engage the closed end of the work piece to shift it outwardly in the jaws for removing the finished work piece from the jaws and said bar.

4. In a device of the character described, a rotary spindle, a hollow head mounted on said spindle, a collet in said head having jaws to grip a work piece and a tubular inner end portion, a circular bar mounted in said tubular end portion and provided with a free end located within the jaws, a slidable sleeve in the head, cooperating means on the sleeve and the jaws to clamp the jaws on a work piece, a spring in the sleeve reacting against the sleeve and the collet tending to shift them in opposite directions to release the jaws, a flange on the bar located between the spring and the collet, and the free end of the bar being shaped to fit the inner side of a tubular work piece and support the walls of said piece against the pressure of the jaws.

5. In a device of the character described, a rotary spindle, a hollow head mounted on said spindle, a collet in said head having jaws to grip a work piece and a tubular inner end portion, a slidable sleeve in the head provided with a shoulder at its inner end, cooperating means on the sleeve and jaws to clamp the jaws on a work piece, a tubular bar mounted to slide in the inner end portion of the collet and including a free end portion located within the jaws, a flange on the bar at the inner end of the collet, a spring between said flange and the shoulder on the sleeve tending to shift the sleeve to release the jaws and to shift the bar forwardly, the free end of said bar being shaped to fit the inner walls of a tubular work piece to support said walls against pressure of the jaws, and a slidable knockout pin in the tubular bar to remove the finished work piece.

6. In a device of the character described, a rotatable spindle, clutch jaws in the spindle to grip a thin walled tubular work piece, a central tubular bar including a free end portion located within the jaws, said free end portion being tapered for a given distance and then substantially cylindrical to fit the correspondingly shaped inner walls of a cartridge shell so as to support the walls of said shell for their full length against pressure of the jaws, an ejector rod mounted to slide in said bar to engage the closed end of the shell to remove it from the jaws and the bar, and means for operating said rod.

7. In a device of the character described, a rotatable spindle, jaws within said spindle for gripping a work piece, a central tubular bar including a free end portion located within said jaws, said free end portion being tapered for a portion of its length and then substantially cylindrical to fit the correspondingly shaped inner walls of a cartridge shell so as to support the side walls of the shell for their entire length against pressure of the jaws, a rod slidably mounted in the bar to engage the closed end of the shell for removing the shell from the jaws and the bar, and means for operating the rod.

8. In a device of the character described, a rotatable spindle, clutch jaws in the spindle to grip a thin walled tubular work piece, means for clamping the jaws on the work piece and releasing them, a central bar within the jaws shaped to fit the internal diameter of the work piece and support its walls against collapse under pressure of the jaws, means for removing the work piece from the bar after the jaws are released, and said bar being provided with a passage to permit flow of air from and to the interior of the work piece as it is inserted on and removed from the bar.

LOUIS MUSANTE.